(12) United States Patent
Schoenbach et al.

(10) Patent No.: US 7,836,110 B1
(45) Date of Patent: Nov. 16, 2010

(54) METHOD AND SYSTEM TO GENERATE AND DELIVER AUTO-ASSEMBLED PRESENTATIONS BASED ON QUERIES OF MULTIMEDIA COLLECTIONS

(75) Inventors: David Schoenbach, Glen Ellen, CA (US); Richard Leddy, Camp Meeker, CA (US)

(73) Assignee: MediaZ, Inc., Glen Ellen, CA (US)

( * ) Notice: Subject to any disclaimer, the term of this patent is extended or adjusted under 35 U.S.C. 154(b) by 137 days.

(21) Appl. No.: 11/168,955

(22) Filed: Jun. 28, 2005

Related U.S. Application Data

(60) Provisional application No. 60/583,718, filed on Jun. 28, 2004.

(51) Int. Cl.
*G06F 12/00* (2006.01)
(52) U.S. Cl. .................................................. 707/829
(58) Field of Classification Search .................. None
See application file for complete search history.

(56) References Cited

U.S. PATENT DOCUMENTS 5,630,121 A * 5/1997 Braden-Harder et al. .... 707/102
6,243,713 B1 * 6/2001 Nelson et al. ............ 707/104.1
6,564,263 B1 * 5/2003 Bergman et al. ............ 709/231
2004/0177069 A1 * 9/2004 Li et al. ......................... 707/5

OTHER PUBLICATIONS

Sherry Marcus and V.S. Subrahmanian "Foundations of Multimedia Database System", Journal of ACM, vol. 43, No. 3, May 1996, pp. 474-523.*

* cited by examiner

*Primary Examiner*—Neveen Abel Jalil
*Assistant Examiner*—Kellye D Buckingham
(74) *Attorney, Agent, or Firm*—Blakely Sokoloff Taylor & Zafman LLP

(57) ABSTRACT

A media query system interprets one or more requests for at least one of media or templates in a framework template based on a user query input, executes one or more search queries based on the one or more requests for media or templates to locate and download candidates comprised of at least one of candidate media elements or candidate template elements, and evaluates the candidates for each of the one or more search queries to select winning media candidates comprised of selected candidate media elements and candidate template elements.

17 Claims, 6 Drawing Sheets

METHOD AND SYSTEM TO GENERATE AND DELIVER AUTO-ASSEMBLED PRESENTATIONS BASED ON QUERIES OF MULTIMEDIA COLLECTIONS

RELATED APPLICATION

This application is related to and hereby claims the priority benefit of U.S. Provisional Patent Application No. 60/583,718, entitled "A METHOD AND SYSTEM TO GENERATE AUTO-COMPOSED, AUTO-DESIGNED, AUTO-ASSEMBLED, AND AUTO-DELIVERED PRESENTATIONS BASED ON USER QUERIES OF MULTIMEDIA COLLECTIONS", filed Jun. 28, 2004, incorporated herein by reference.

FIELD OF THE INVENTION

The present invention relates generally to intelligent user interfaces, and more specifically, intelligent multimedia interfaces based on user queries of multimedia collections.

BACKGROUND OF THE INVENTION

Prior art has demonstrated progress in recent years in the areas of dynamic media, in which a known position in a layout, such as a table position on a web page, is filled with a media element by means of a search query (e.g., dynamic HTML). In some cases, such as HTML formatted data displayed in a browser, the functioning of the browser, along with pre-determined tagging of the content, provides some adaptability, such as the automatic wrapping of text around an image placed within a news article on a news web page. Style sheets and other types of template output have provided additional improvements in quality of media display.

However, these style sheets and templates cannot differentially handle (i.e., select, modify and display) media depending on associated metadata, or on qualities of the media itself, or in the number or quality (e.g., relevancy ranking) of results, or on the quality (e.g., see search degradation) of the search query which drives selection of media. Further, present techniques do not allow for management of multiple results such that they can differentially be displayed, with a trajectory, flow, layout, or style (e.g., including determiners such as color influences, pace, genre, mood) used appropriately in consideration of the query and the various media.

Further, there is a lack of an automated means for making assumptions about user interest in a topic, or likely user intent in initiating a search; nor has there been a means of utilizing and/or modifying such assumptions in the course of creation of a presentation. Additionally, there has been a lack of an automated means of modifying media and modifying the structural properties (i.e., the template) of the output presentation. Finally, there has been a lack of an integrated means of benefiting from metadata and/or analysis of media for the purpose of driving the design, and/or display and presentation of those media.

BRIEF DESCRIPTION OF THE DRAWINGS

The present invention is illustrated by way of example, and not by way of limitation, in the figures of the accompanying drawings in which.

DETAILED DESCRIPTION

In the following detailed description, numerous specific details are set forth in order to provide a thorough understanding of the invention. However, it will be understood by those skilled in the art that certain embodiments of the present invention may be practiced without these specific details. In other instances, well-known methods, procedures, components, and circuits have not been described in detail so as not to obscure the presented embodiments of the invention. The following detailed description includes several modules, which will be described below. These modules may be implemented by hardware components, such as logic, or may be embodied in machine-executable instructions, which may be used to cause a general-purpose or special-purpose processor programmed with the instructions to perform the operations described herein. Alternatively, the operations may be performed by a combination of hardware and software.

Integrating commercially available and proprietary software components results in a system used to respond to user queries of multimedia collections (the world wide web or smaller, more controlled and tagged collections) with auto-composed, auto-designed, auto-assembled, and auto-delivered presentations of composite media to the user, static or time-based, which both contain media relevant to the user's query and which adhere to good multimedia design principles, by taking a heuristic, iterative, and adaptive approach to media selection, template selection, media transformation, and template transformation.

In various embodiments of the present invention, a search is used in a variety of other contexts, including auto-population with media elements of an authored text document (e.g. automatic image population of a bulleted PowerPoint® document), auto-selection—without user intervention—of media for web, mobile devices, or interactive TV advertisements (e.g., adding user-profile-specific music to an automobile ad), automatic design of a slideshow or video-based illustration of a musical selection (i.e., automatic music videos), scientific or medical visualization in which vast datasets with visual and/or audible components or representations can be made more useful by composition of small relevant subsets into forms useful for human analysis or improved accessibility, and automated multimedia design, in which completed presentations or drafts of presentations (e.g., web sites, Macromedia Flash® animations, Powerpoint® presentations) are composed on the fly by implementing template documents rendered against a query, a group of queries, or other semantic drivers.

Figure 1:
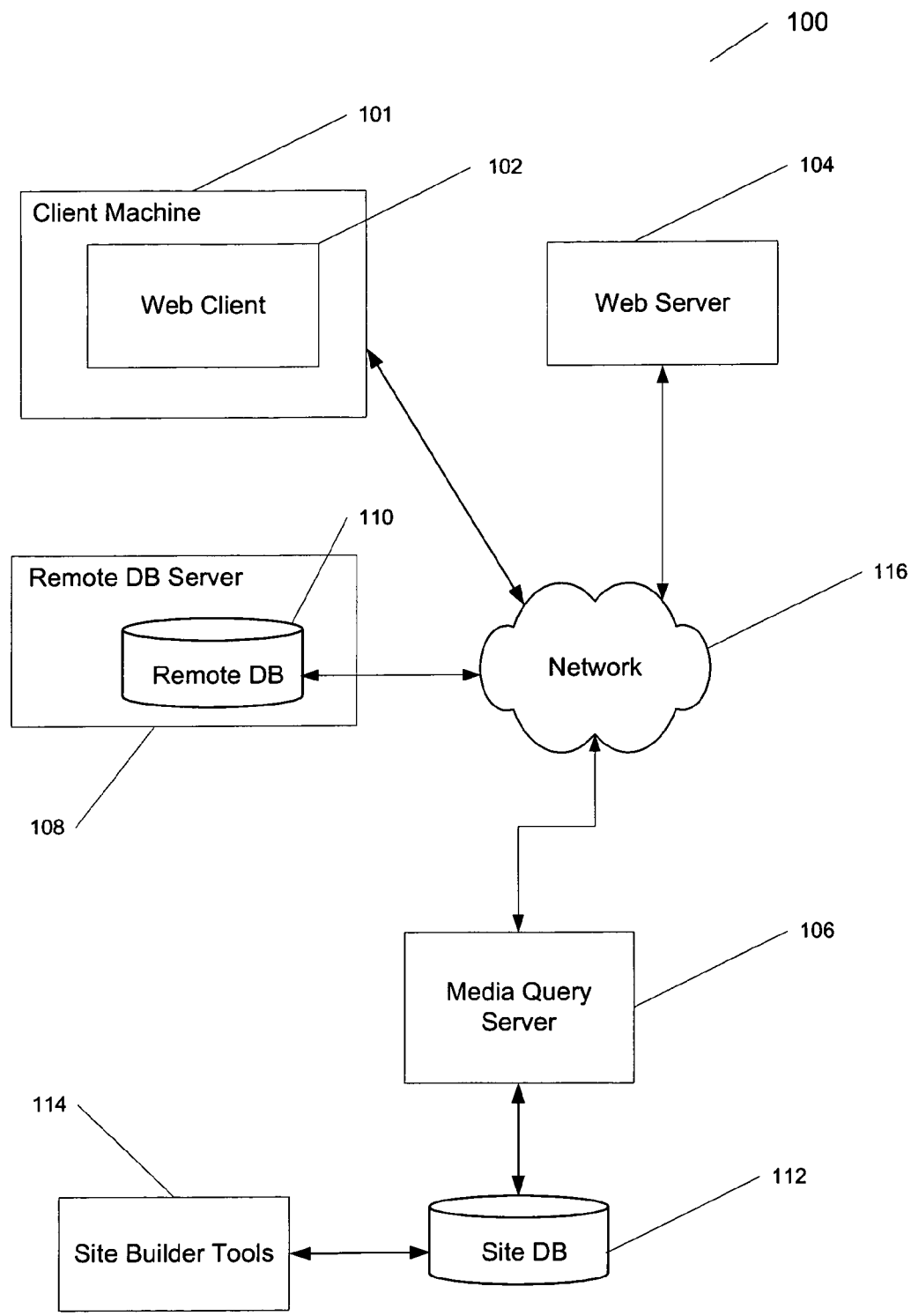
FIG. 1 illustrates a component diagram of a media query system, according to one embodiment of the present invention.

FIG. 1 illustrates a component diagram of a media query system 100, according to one embodiment of the present invention. The media query system 100 illustrates a flow among main components of the system, which include a web client 101, a web browser 102, a web server 104, a media query server 106, a remote data server 108 and a remote database 110, a site database 112, and site builder tools 114. In various embodiments, site builder tools 114 may be part of the media query server 106 or an independent developer machine (not shown) coupled to the site database 112 and/or the media query server 106. The web server 104, media query server 106, client machine 101, and remote data server 108 are each connected to network 116. In one embodiment, the network 116 is the Internet while in other embodiments network 116 is a LAN (local area network) or a WAN (wide area network).

The web server 104 is connected to the client machine 101 through the network 116 using a communication protocol such as TCP/IP (transmission control protocol/Internet protocol). User query inputs from the web client 102 are received and processed at web server 104 (e.g., Microsoft IIS®) such that a session may be started at media query server 106 (e.g., via TCP/IP). In various embodiments, the files exchanged between the web server 104 and the web client 102 and between the web server 104 and the media query server 106 may be any file type known in the art, such as .html (hypertext), .aspx, .asp, or .swf (Macromedia Flash®).

In response to a session initiation, according to one embodiment of the present invention, media query sever 106 may access the remote data base 110 on the remote database server 108 through network 116 to search for potential media for the presentation. Remote database 110 may include data such as media files (e.g., video, audio, text, etc.), and media metadata. In another embodiment, media query server may directly access a local database, site database 112. Similar to the remote database 110, site database 112 may include various types of files, such as media files (e.g., video, audio, text, etc.), and media metadata. Additionally, in various embodiments, site database 112 and/or remote database 110 may include template rules and definitions, presentations, terms, media and template requests, media and template offerings, and keyword associations.

In one embodiment, a set of data structures are configured to support searching for media, compositing of selected media, and location and retrieval of selected media for presentation generation. These data structures may include media offerings, media requests and may consist of objects stored within SQL database tables, such as ImageOfferings table, etc., and ImageRequests table, etc.

Such a set of data structures may support a full range of programmatic control, from fully specified (hard-wired) presentations to highly abstract presentations, differentially implemented depending on context (where context is determined by user query, site type, site default template, and found media). The data structures may also support semantic (keyword or term variables) tagging of templates and request interpretation including request strings that may contain literals (e.g., "San Francisco") or term variables (e.g., city_v), to support slot-specific specification of media or template requests and/or commands (e.g., "inheritFromParent, inheritFromTree") to support passing of semantic information. The request string interpretation may utilize the semantic subsystem (described elsewhere), and may therefore contain dot-operated literals or term variables, supporting various term replacement functionality.

The data structures may further be supported by a language, which supports parsing of data files containing such a set of media, for offline (e.g., site design time) population of a database. Additionally, the data structures may further be supported by a parsing tool (e.g., mqParser.exe), implementing such offline population of a database.

In various embodiments of the present invention the data/data structures may be located in one or more databases. For example, remote database 110 and/or site database 112 may include various tables, such as media offerings tables (e.g., ImageOfferings, TextOfferings, VideoOfferings, TemplateOfferings), media request tables (e.g., ImageRequests . . . ), media lookups tables (with URL associations for offerings), terms tables ("allTerms" dictionary) including keyword associations table and linkTypes table, region tables, models tables (e.g., scaling, transparency, motion models) and a persistent symbols table. Media offerings tables include fields such as offering ID, a unique identifier, lookup ID, a link to a URL or other access string, semantic match data (keywords), title, permissible transforms, a list of allowable operations or transformations), usage rights, restrictions, royalty information; also minimum, maximum, and default value for various parameters (e.g., time duration, width, height, Z order, etc.), and flexibility type and flexibility degree settings for various parameters (e.g., duration, intensity, width, height). Media request tables include fields such as request ID, request rule, permissible transforms, constraints; also minimum, maximum, and default value for various parameters, and flexibility type and degree for various parameters. Additionally, a helper application may be utilized to support database maintenance of terms and keywords and links tables.

Returning to FIG. 1, Site builder tools 114 includes tools for accessing and manipulating files stored on the site database 112. These tools may include, but are not limited to, semantic tools for managing terms and keyword associations, and parsing tools for managing templates, request rules, design rules, and other rules pertaining to the presentation of composite media.

Further, while the media query system 100 shown in FIG. 1 employs a client-server architecture, the present invention is of course not limited to such an architecture, and could equally well find application in a distributed, or peer-to-peer, architecture system.

Figure 2:
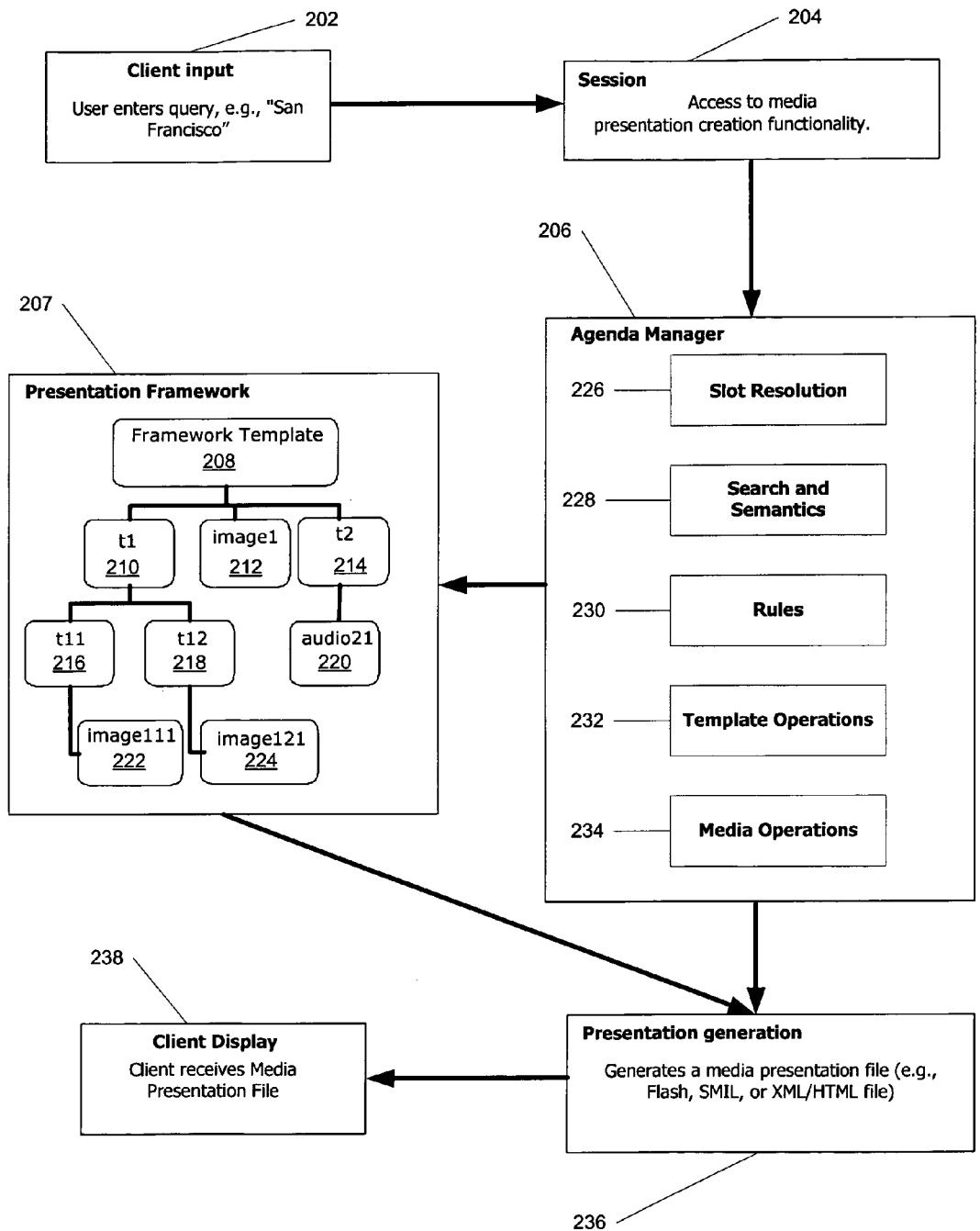
FIG. 2 is a block diagram illustrating an overview of program flow in creating a presentation, according to one embodiment of the present invention.

FIG. 2 is a block diagram illustrating an overview of program flow in creating a presentation, according to one embodiment of the present invention. The diagram includes a client input 202, wherein a user enters a user query input, such as "San Francisco," in web client 102 on client machine 101 (e.g., see FIG. 5). In one embodiment, a web page displayed on web client 102 offers a text input control to the user, into which the user types a term or terms. In another embodiment, web site logic may generate or select a query string, or a presentation previously generated and delivered to the web site may contain, generate, or select a query string. The term or terms will be supported terms if they, or known variants, are known to the system via a system dictionary located within the media query system 100 and accessed by web server 104 and/or media query server 106. In yet another embodiment, terms will not be required to be known by the media query system 100, but will simply use any input string from the user as a query to pass for keyword matching to one or more supported multimedia collection databases, such as remote database server 108.

The query is received at web server 104, which communicates with media query server 106 to initiate a session. The web server 104 initiates a session by sending a string containing three substrings specifying site type, query, and framework. Session module 204 located at media query server provides discrete (threaded) access to media presentation creation functionality.

The media query server 106 includes an agenda manager 206 configured to manage an agenda of compositional tasks to populate a presentation framework 207 that may include a hierarchy of templates beginning with a framework template 208. In one embodiment of the present invention, the framework template 208 may include media and other templates. For example, media may include image(1) 212, audio(21) 220, image(111) 222, and image(121) 224. Examples of other templates under the framework template 208 include t(1) 210, t(2) 214, t(11) 216, and t(12) 218. As illustrated in the presentation module 206, the media and templates under the framework template 208 forms a hierarchy of templates, each terminating in media nodes resolved by winning media candidates to be assembled into or define the presentation of composite media.

The agenda manager 206 utilizes a rules module 230 to make decisions about the content and format of the presentation of composite media. The rules module 230 may be utilized to execute various functions in defining and assembling a presentation of composite media, functions such as searching, proposing media operations, proposing template operations, proposing modifications to search criteria, and proposing modifications to slots on an agenda, in particular where slots represent work items of a presentation, each of which must be populated by candidates.

In one embodiment of the present invention, the rules module 230 includes an inference engine (e.g., CLIPS—C language integrated production system) that makes decisions about the handling of candidates and/or slots. For example, rules module 230 may trigger various actions, such as execution of other rules, assertion of facts (e.g., within CLIPS) and addition of facts to one or more lists of facts associated with candidates or slots, proposal of operators, re-weighting of candidates, recalculation of slot attention ratings, and splitting candidates (see below). In one embodiment of the present invention, generating a media presentation may include the agenda manager 206 using a planning or agenda algorithm to determine which agenda slots are populated with media (i.e., media or template) candidates, and making a candidate evaluation. This may include providing access to knowledge sources for decision-making in population, slot status rating, and/or candidate evaluation. In various embodiments, the rules implemented by rules module 230 may include one or all of general rules that pertain to all implementations of media query system 100, rules that may be website implementation specific and rules that are framework specific. For example, there may be one or more rules that tailor a search parameters according to the physical configuration of client machine 101 (i.e., a cell phone display versus a personal computer display).

In one embodiment, the rules module 230 utilizes various other modules of the agenda manager 206, such as a slot resolution module 226, a search and semantics module 228, a template operations module 232, and a media operations module 234 to define the presentation of composite media.

In varying embodiments, the search and semantics module 228 may use an API (application program interface) or other executable using TCP/IP or other protocol to go through a media gateway to access remote sources such as remote media repositories (e.g., at remote database 110) and/or do its own searching for local media (e.g., at site database 112). The API may further update local information pertaining to access and content of remote resources as that information comes through the gateway.

In one embodiment of the present invention, the presentation generation module 236 generates a media presentation file based on the presentation of composite media that is defined by the agenda manager 206 based on the presentation framework 207, after which such file may be communicated to client display 238 at client machine 101. It can be appreciated by those skilled in the art that in various embodiments all or a portion of modules set forth above may be located anywhere within the media query system 100 and is not limiting.

In one embodiment, multi-threading around the rules module 230 may be used to provide user-session-specific copies of all writable or updatable terms and variable objects used in presentation assembly and for discrete user session access to an external media gateway, as well as to lock access to the rules module 230 and to the user tcp/ip client (e.g., web client 102).

The agenda manager 206 initially uses the slot resolution module 226 to place the framework template, or root template, as the first slot on an agenda. The agenda manager 206 attempts to resolve the first slot. If, for example, the first slot contains another template, the agenda manager 206 generates options for resolution using the search and semantics module 228. The result may be additional slots—templates and/or other kinds of media slots, such as t(1) 210 or image(1) 212, respectively—being placed on the agenda as agenda items. Each agenda item is managed as an item of work which contributes to the entire presentation, addressing population of a slot, and transformation of slot contents. In one embodiment, multi-slot transformations are supported, in which groups of slots are managed under a common transformation algorithm.

In one embodiment, the agenda manager 206 uses the rules module 230 to populate slots with candidates, evaluate slot candidates to determine the best, and manage performance by pruning slots and/or dropping slot candidates. Pruning of slots refers to the reduction below a preset prune threshold of the attention rating for a given slot. The agenda may be iteratively pruned by the agenda manager 206 to make sure that only viable slots are processed through threshold pruning and identification of problems (i.e., slots) already solved, by setting attention ratings for slots and comparing them to the prune level threshold. An operator, or operators, may influence a slot's attention rating, reflecting decisions such as 'good enough', 'too many elements', or 'excessive sub-template tree depth (i.e., hierarchy). The prune level may have a value hardwired into the code and/or may vary by application of framework-specific rules within the rules module, or by other heuristics. For example, in order to manage the performance of the system, the value of the prune level may be set according to a rule that sets a maximum threshold time for the total time for agenda resolution.

In order to populate each slot on the agenda by one or more candidates (e.g., a candidate template element or a candidate media element), each slot on the agenda contains a request attribute. In one embodiment the slot also contains an "is Abstract" attribute which indicates whether keyword search is to be undertaken in order to find candidates to satisfy the slot. If "is Abstract" is set to the value false, it indicates that the request attribute is not the name of a media search request, but that rather it is an explicit (or "concrete") reference to a single media element candidate, which is thus identified, by media identifier stored either local to or remote from the media query server 106, by the search and semantics module. Alternatively, if "is Abstract" is set to the value true, the request attribute is expected to refer to a media request, which media request is interpreted by the search and semantics module, which then executes the search against existing media offerings for candidates (e.g., image, video, text, animation, text stream, actions, or template offerings) in the site database 112, and/or against remote media search systems, such as remote database 110, via network 116, to generate one or more candidates. Candidates are assigned evaluation parameters as they are added to a slot (e.g., t(1) 210 or image (1) 212). In varying embodiments, the evaluation parameter may be a numerical/text value based on a statistical weight, previous use statistics, user ratings, candidate supplier rankings, or developer rankings. The evaluation parameters determine the candidates' relative worth to each other and/or the presentation and are influential in choosing a winning media candidate for a given slot. Further, evaluation parameters of candidates of a given slot may influence values assigned to evaluation parameters of candidates for other slots, such as through the application of template operations.

In one embodiment of the present invention, a candidate template element is selected as a winning media candidate for a slot based on the influence or context of the key term and/or associated terms derived from the user query input. The result may be a significant difference in the layout, look-and-feel, functionality, duration, size, or other major or minor quality, of the presentation of composite media. For example, if "San Francisco" is entered as the user query input, a candidate template element including a "More on San Francisco" button may be the winning template, which enables a user to click and experience a time-based San Francisco travelogue-style presentation. In another example, if "snake" is entered as the user query input, a candidate template element may include functional elements that would cause some or all the image media elements to visually move over time in the style of a "wiggle."

In one embodiment, agenda manager 206 invokes rules module 230 to create a new candidate from a current candidate by proposing, or appending, operators from the template operations module 232 or the media operation module 234 to the current candidate for a slot (i.e., "splitting" the current candidate). In various embodiments, applying media operators from the media operations module 234 may transform non-template media, for example image manipulation—sizing, colorizing, blurring; or audio manipulation—changing duration, volume or audio effects settings. Applying template operators from the template operations module 232 may transform templates, for example cloning subparts in a template, changing arrivals and/or durations of time elements, changing the background color of the presentation or template's regions, or changing the semantic content of the slot requests associated with slots contained in the template. In one embodiment, these transformation operations may be grouped and form part of a transformation algorithm that may be applied to groups of slots.

In one embodiment, the agenda manager 206 may access knowledge about media found by direct analysis, such as color histogram data associated with an image, or the tempo and beat placement of a song in an audio file, which knowledge may be utilized in template operations by the template operations module 232 or media operations by the media operations module 234. For example, an auto-trim operation may trim black edges from a photograph, which is made possible by the media operations module 234 invoking an auto-trim analysis function which implements a color analysis algorithm of the image candidate data. Alternatively, such knowledge may be utilized to provide additional terms or values to be associated with media elements for determining search matching by the search and semantics module 228. Further, such knowledge may be utilized to provide values to be associated with media elements for influencing candidate evaluation, such as image height and width data, determined by direct analysis of an image candidate as opposed to by pre-associated metadata, which is used by the rules module 230 to change evaluation parameters based on image aspect ratio of the candidate.

In one embodiment, the proposal of an operator may reset the evaluation parameter (e.g., weight) of the candidate or propose that a new search be undertaken. The integrating of search with design rules and media compositing may include providing extensibility such that media generator components may be developed, internally or externally (e.g., via plug-in software), to support media generation by various methods or in various formats. For example, a composite of images may be laid out in the format of a scatter chart or other charting style, with images selected to correspond to X, Y values, such as images of autopsied lung tissue placed along X (e.g., cigarette packs per day) and Y (e.g., age at death). Alternatively, ideographic characters, such as from a document written in Mandarin Chinese, may be arranged to display character definitions as well as document translation, along with the original characters, for language training purposes. In one embodiment, a weighting algorithm component may be used for extensibility, internally or externally (e.g., via plug-in software), to differentially implement candidate weighting and/or slot attention rating. Operator components may be developed for extensibility, internally or externally (e.g., via plug-in software), which provide access by the rules module 230 to additional operator functionality.

In one embodiment, the rules module 230 includes a pattern-matching algorithm containing a set of conditions (the "left-hand side" or LHS) and responses or actions (the "right-hand side" or RHS). The LHS conditions will be satisfied by the presence (i.e., the currently scoped assertions) of a set of one or more facts or other constructs containing facts. The RHS will be invoked only on the satisfaction of the LHS. RHS responses will variously include proposal of operators, changes of weight of a candidate or candidates, changes of attention rating of a slot or slots, assertion of facts for subsequent pattern matching by the rules modules 230, and/or changes in the scope of a fact or facts, such that the fact is asserted in one or more subsequent activations of the rules module 230 for a particular candidate (i.e., narrow scope), a slot in general (broader scope), or the entire presentation in general (broadest scope). In this embodiment, the rules module 230 is provided access to facts, by the agenda manager 206, for pattern matching. Facts about the candidate and about other aspects of the state of the presentation environment are asserted. Operators may, when applied, add and/or remove facts from a fact base associated with rules module 230. For example, facts may be asserted which cause the rules module 230 to avoid repeated proposing of the same operator for a given candidate, or to pass other information relevant to operator proposal decision-making.

Thus, design rules, including a collection of pattern matching rules available to the rules module 230 for the creation of a presentation, given a specific framework, may determine qualities of presentation creation. The design rules are fed by input from the site, such as the initial query, the site type variable, and an initial presentation template specification, which one or all may determine string variables which in turn determine assertion of facts for pattern-matching in the rules module 230. The design rules may influence additional searches and selection of candidates for various slots, propose operations to transform template or other media slots, including transformations which eliminate or copy (or copy with significant modification) slots within a template, or otherwise make major or minor structural changes, or more local changes, such as image manipulation.

In one embodiment, additional decision-making tasks may invoke the rules module 230 prior to candidate selection in order to influence search criteria, and to classify groups of objects in the system (e.g., "multi-slot" candidates) for common re-weighting.

In other embodiments, actions and events may also be supported, which enable a universal implementation of additional program functionality, as well as user interface controls (e.g., buttons), to support intra-presentation jumps, jumps to URL's (uniform resource locator), and any other program functionality. Button functionality may require knowledge of inter-relationships with other slots in the presentation. Other embodiments may rely more heavily on the rules module 230 to manage knowledge about those relationships.

Figure 3:
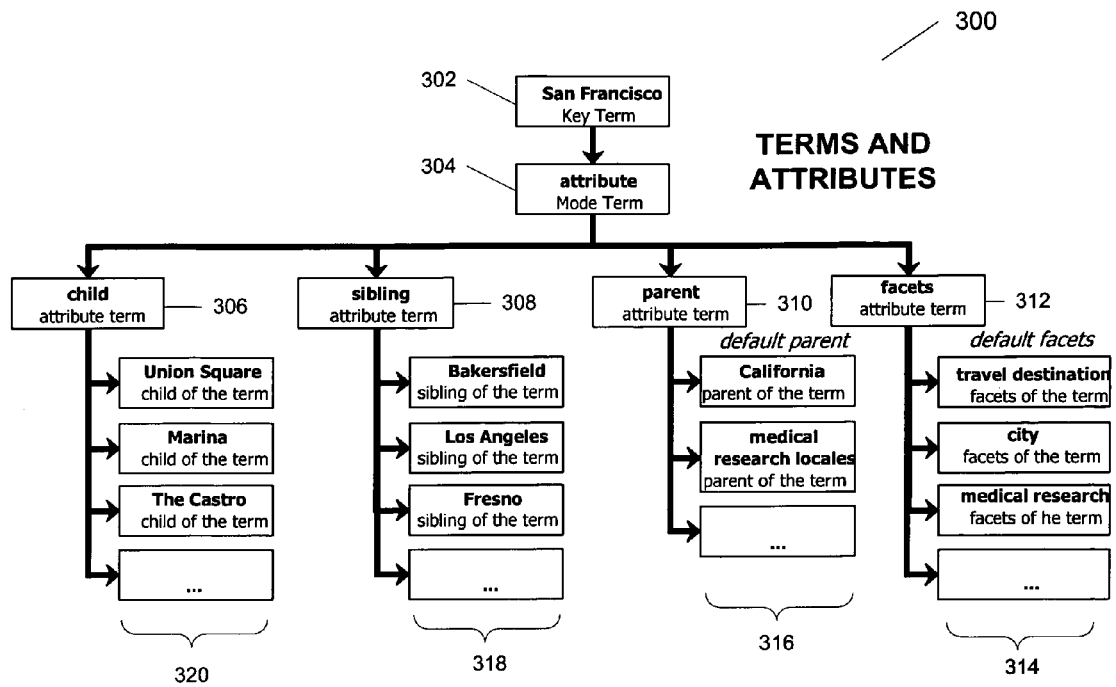
FIG. 3 illustrates a semantic term and attributes tree, according to one embodiment of the present invention.

FIG. 3 illustrates a semantic term and attributes tree 300, according to one embodiment of the present invention. The semantic portion of the media query system 100 supports hierarchical relationships, such as child 306, sibling 308, and parent 310 referring to nodes on the semantic term and attributes tree 300. Also supported are facets 312, each of which is a list of facet items 314. Similarly, child 306 includes child items 320, sibling 308 includes sibling items 318, and parent 310 includes parent items 316. In one embodiment, request string evaluation in the media query system 100 supports dot-operated syntax. For example, the request string term.child[2] based on the term "San Francisco" in the semantic term and attributes tree 300 would yield "Marina," the second term of child items 320.

In one embodiment, searching, designing, and compositing media for providing replacement of a semantic term by other semantic term(s) includes the search and semantics module 228 to provide dot-operations and hierarchical relations. For example, as similarly described above, aTerm.sibling[4] yields the 4$^{th}$ child of aTerm's parent given its placement in a hierarchy currently supports "attribute" links, which include: sibling, parent, child, facets.

In one embodiment, terms may be associated such that the rules module 230 may interpret proposed query strings to support categorized substitution of terms, default categorizations for all terms, and mode assignments supporting differential substitution of a term by other term(s), depending on modal context (e.g., modes may differentially determine "artichoke is-a food" where mode is "usage" vs "artichoke is-a thistle" where mode is "taxonomy").

The agenda manager 206 may use default and alternative mapping (the aforementioned lists or facets) of user intent to a set of related terms. This may include the use of default and alternative facet lists that attempt to reflect the system's best guess of user's intent or interest in a topic. (Note that facet lists can also be thought of as a mapping of a topic to a subtopic list specifically for the purposes of presentation.) Further, such facet lists and their facet items may be used in interpretation of request strings.

Figure 4:
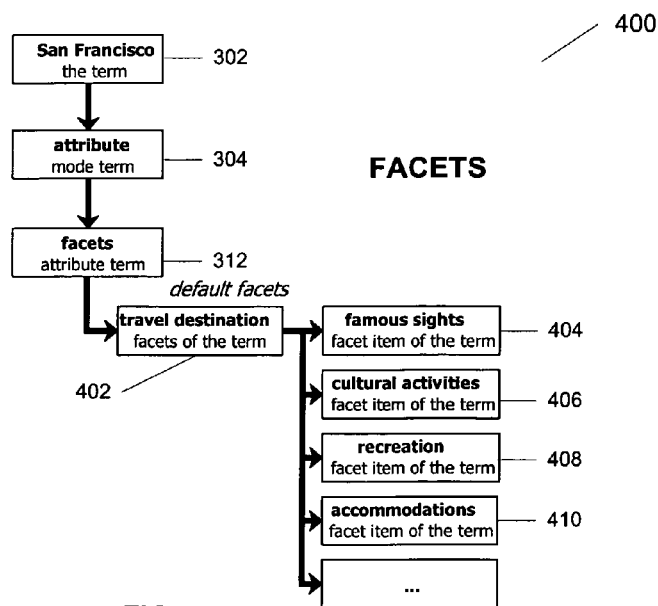
FIG. 4 illustrates additional facet items of facets, according to one embodiment of the present invention.

FIG. 4 illustrates additional facet items of facets 312, according to one embodiment of the present invention. The search and semantics module 228 supports terms manipulation for interpretation of request strings, in order to generate search strings. Here, given the term "San Francisco," a request for its facets (where facets is an attribute of San Francisco) is interpreted as an array, containing terms, famous sights 404, cultural activities 406, recreation 408, and accommodations 410, etc. In this example, this particular mapping is done because the default facets list for cities is the travel destination 402 facets list. This kind of mapping enables assumptions of user intent in querying the media query system 100, as in the assumption that the default interest in "San Francisco" is as a travel destination; and it supports a branching presentation structure (e.g., storyboard segments, HTML pages) on various likely subtopics of interest. A counter example also supported by the semantic subsystem's terms manipulation takes the user query "autism research." Assuming that one of the branches of a template triggered for this presentation has a "'key_v' AND 'locale_v'" request string which is interpreted as "'autism' AND 'medical research locales'", then a sub-branch of that branch may seek media about" 'medical research facilities' AND 'medical research locales.child[17]'," which would interpret as "'medical research facilities' AND 'San Francisco'" (the 17$^{th}$ child of "medical research locales"). The facets for "San Francisco" could thereby be reset to "medical research", which would support assembly of a meaningful, well-structured sub-presentation on autism research in San Francisco.

In one embodiment, the agenda manager 206 may utilize the search and semantics module 228 to degrade a search query to make the search broader when the initial query fails to find media, and may also parse a search query and degrade individual terms to make the search broader, such as in the case of an initial search query which fails to find media. Further, such modification of a search query may parse the search query and degrade individual terms within the larger search string (e.g., "'San Francisco' AND 'City Lights Bookstore'" may degrade to the more general "'San Francisco' AND 'bookstore'"). Selection of the sub-term to be degraded may be under program control based on rules from rules module 230. The rules module 230 and the search and semantics module 228 may be utilized by the agenda manager 206 to determine which term to degrade (e.g., "'The Beats' AND 'City Lights Bookstore'" vs. "'San Francisco' AND 'bookstore'"). Generalizing (i.e., degrading) attributes may also be used, such as 'parent' or 'species'.

In one embodiment, the search and semantics module may enhance the search query by narrowing the scope of a search through replacement of a term in a search string with the attribute term associated with an attribute such as 'child' or by modifying the search string to add a boolean AND along with a 'child' or 'facet.'

The performance of media query system 100 may be improved through the enhancing and/or degrading used in the service of template operators, which may generate or prune as necessary media slots, to reflect a 'best fit' of the terms of an initial query string found in (or interpreted from) a media request, such that the various subparts are enhanced and/or degraded using the most appropriate attributes (e.g., 'child') and attribute terms (e.g., in the context of San Francisco, 'Union Square'). The process may be further optimized by evaluating the results of search, and implementing alternatives (e.g., if no found media, try different children vs. degrade other term). Alternatively, the quality of a resulting presentation rather than the performance of the media query system may be improved, such as by the use of modified (e.g., degradation described above) search strings when no "hits" result from an initial or preliminary search.

Figure 5:
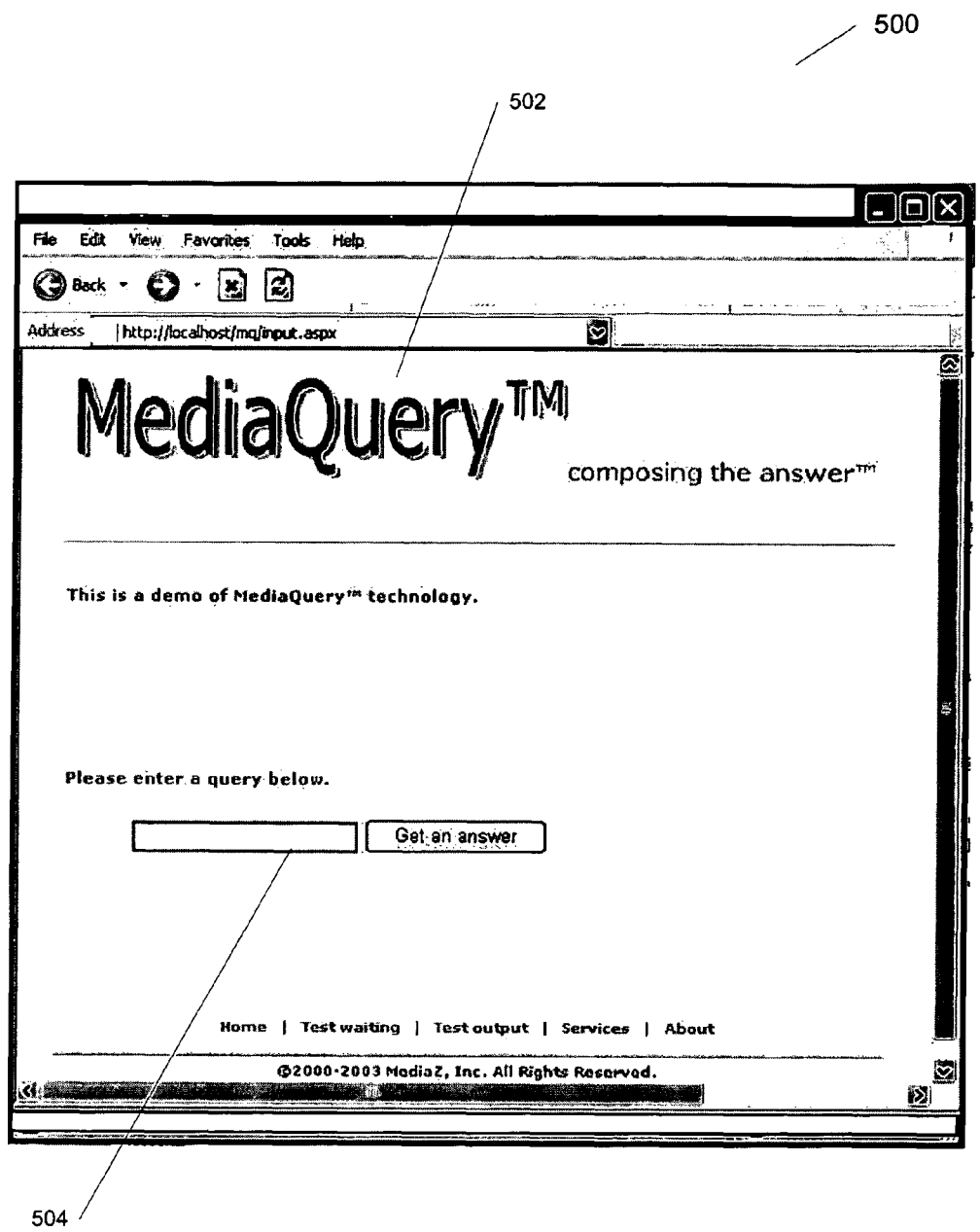
FIG. 5 is a screenshot of user input page, according to one embodiment of the present invention.

FIG. 5 is a screenshot 500 of user input page 502, according to one embodiment of the present invention. The user input page 502 shows a web page (.aspx) that may be shown on web client 102 of client machine 101 offering the user a text box 504 for input of a query. In one embodiment, when the user enters a string in the text box 504, the web server 104 hosting the web site that sent the user input page 502 sends the string plus an additional string assigned to the siteType_v variable (specific to the site or to that particular input control) and optionally a proposed framework template name to the media query server 106 to initiate a session.

Thus, to generate an output based on the user input, according to one embodiment, a corresponding framework template is fully resolved according to the methods described herein, the agenda manager 206 passes program control to a presentation generation module 236 to generate an abstract (i.e., format neutral) presentation from the resolved framework template and then to generate a format-specific presentation as determined by the client interface (e.g., web browser). Such formats include, but are not limited to Flash (as illustrated in FIG. 6) or SMIL (synchronized multimedia integration language) output formats.

Figure 6:
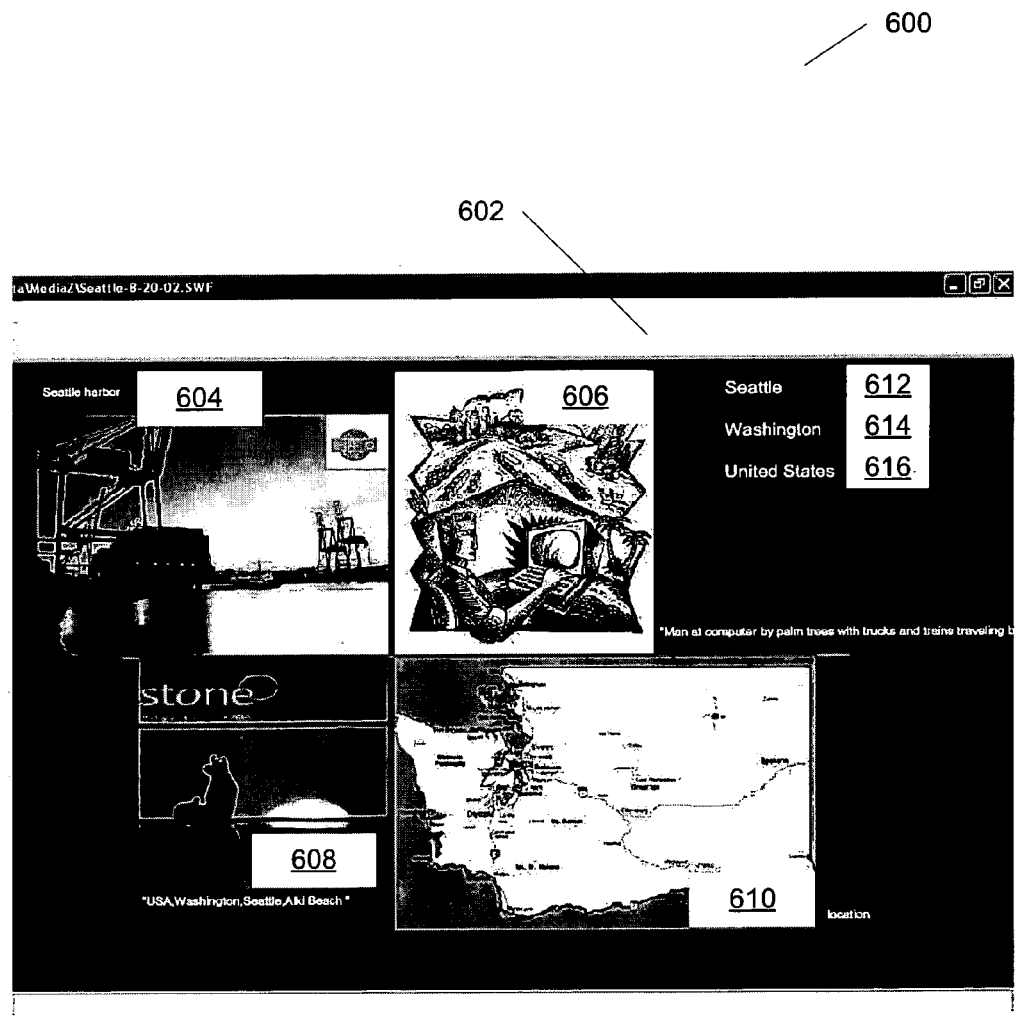
FIG. 6 is a screenshot of sample output from the media query system, according to one embodiment of the present invention.

FIG. 6 is a screenshot 600 of sample output 602 from the media query system 100, according to one embodiment of the present invention. The screenshot includes Macromedia Flash output from media query server 106. The four images, 604, 606, 608, and 610 of this main navigation screen include the functionality of a button, which when actuated cause the media query system 100 to find, load and transmit secondary pages and/or additional composite media presentations on subtopics related to Seattle contained within the generated presentation file. An alternative embodiment may use buttons to trigger generation of a new presentation to be immediately or subsequently displayed according to the methods and operations described herein. In one embodiment, audio may also play through sample output 602, with different subtopic-specific audio on subsequent pages. The audio may be music, narration, other audio, or any combination thereof.

Text elements 612, 614, and 616 show the key term, "Seattle," its parent attribute term, "Washington," and its grandparent term, "United States." These text elements may be for display or may be a button, which when actuated cause the media query system 100 to find media and compose, load and transmit pages and/or additional composite media presentations on the hierarchal relationships represented in the text elements, according the methods and operations described herein.

Figure 7:
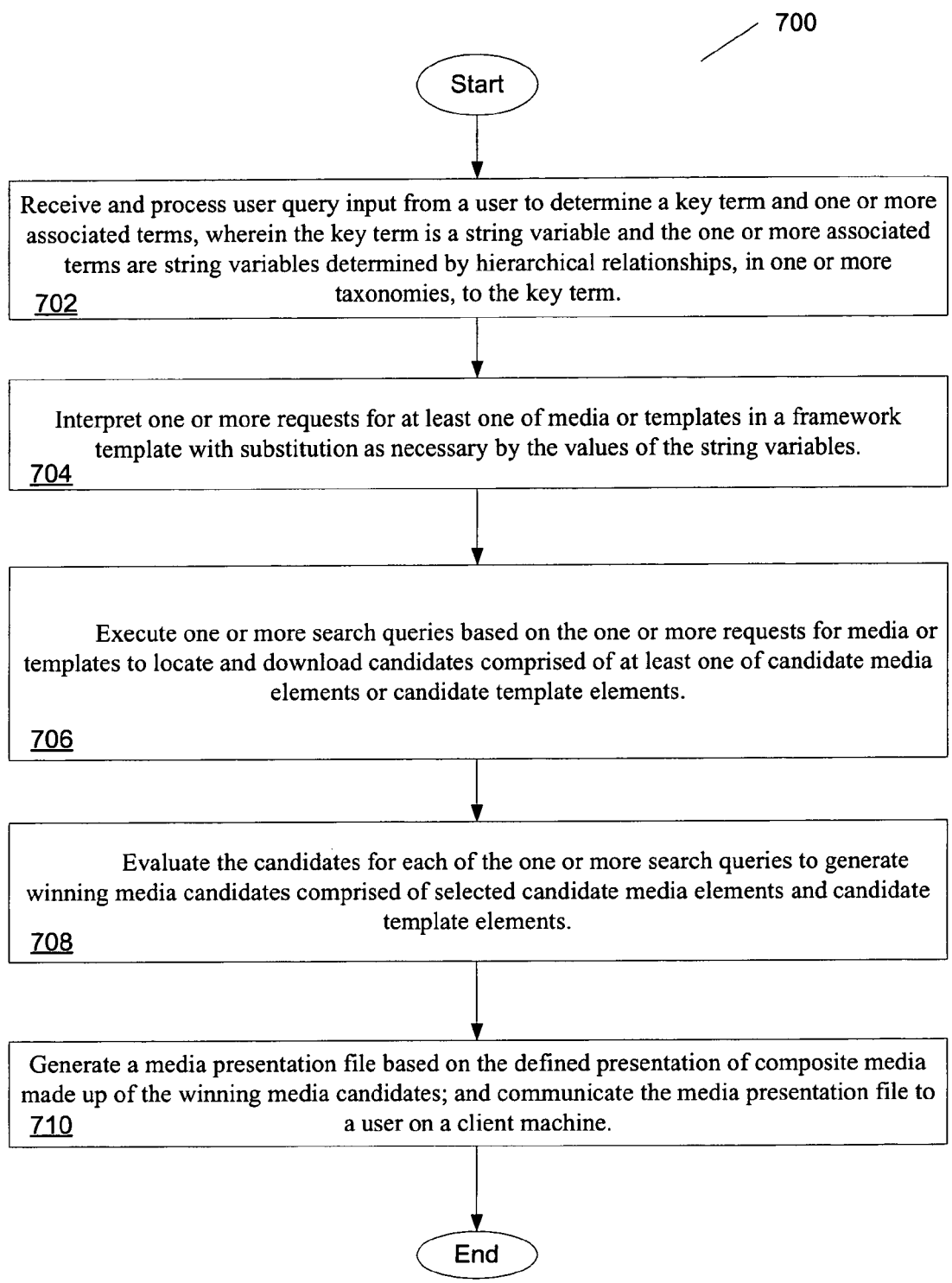
FIG. 7 is a flow chart illustrating operations to define, generate and communicate a presentation of composite media for display on a user/client machine, according to one embodiment of the present invention.

FIG. 7 is a flow chart illustrating operations to define, generate and communicate a presentation of composite media for display on a user/client machine (e.g., client machine 101 of FIG. 1), according to one embodiment of the present invention. At operation 702, user query input is received from a user and processed to determine a key term and one or more associated terms, wherein the key term is a string variable and the one or more associated terms are string variables determined by hierarchical relationships, in one or more taxonomies, to the key term. Then, at operation 704, one or more requests for at least one of media or templates in a framework template are interpreted with substitution as necessary by the values of the string variables, above, and, at operation 706, one or more search queries are executed based on the one or more requests for media or templates to locate and download candidates comprised of at least one of candidate media elements or candidate template elements. After which, at operation 708, the candidates are evaluated for each of the one or more search queries to generate winning media candidates comprised of selected candidate media elements and candidate template elements. Finally, at operation 710, a media presentation file is generated based on the defined presentation of composite media made up of the winning media candidates; the media presentation file is then communicated to a user on a client machine.

In one embodiment of the present invention, the media query system 100 may be used as a front-end or presentation layer engine for display of search results in the context of a search portal. Further, such use in the context of a search portal supporting multiple media types. Further, such use in which a means is provided for URL hyperlinks to web pages, media elements, or shopping cart functionality, or other extra-presentation locations; or similar links within the presentation or a sister presentation managed and/or generated by the same system.

In another embodiment, the media query system 100 may be used in the context of an Internet or intranet site, or for a mobile device or interactive TV, in which a personal profile populates the system with data, which is used to personalize the presentation output. Further, such a use in the context of Internet ads or interactive TV commercials.

In yet another embodiment, the media query system 100 may be used in the context of personal medical records display, in which personal medical records and optionally medical professionals' input function as drivers for media creation, e.g., patient self-help documentation or video creation, post-operative instructions, or other documents for patients and/or medical professional use. Further, such use in a diagnostic function, such as medical images (e.g., pre-operative MRI images of a knee with meniscus damage) placed in visual proximity with other images (e.g. similar MRI images with known surgical outcomes). Further, such use in which image placement is a visual indicator of outcome (e.g., a success curve). Further, where image analysis is used to determine similarity of images; and where similarity determines selection and/or positioning of images.

In one embodiment, the media query system 100 may be used in the context of an eCommerce site or other business context, as a visual output engine for existing automated product configuration tools, e.g., for creating a display of best components—in the form of a diagram and/or a chart—for a given customer's requirements.

Specifically, such a use supported by the system's ability to manage multiple product/part candidates as well as multiple image or text description or other media candidates for any given product/part. Further, such a system in which the existing automated product configuration tool is tightly integrated into the above system as an operator and/or operators. Further, such a system in which the automated product configuration tool is not pre-existing, but is created as an external operator and/or operators, i.e. as plug-ins to the above system.

In another embodiment, the media query system 100 may be used as a multimedia design tool, in which significant design decisions are made programmatically, such that a draft design may be created with minimal—e.g., via wizard or form—user input.

In another embodiment, the system may be used as a plug-in or add-on to a multimedia design tool, in which text elements (e.g., PowerPoint page titles and bullets) drive search for image or other media (e.g. from a corporate image database), resulting in auto-population with media of an otherwise text-only presentation.

In one embodiment, the media query system 100 may be used as a user interface development tool for medical or scientific visualization applications, in order to provide dynamic, organized, perceptually-tuned presentation of relevant output, i.e. in as comprehensible a format as possible. Further, such an application used for facilitating extremely rapid user "A/B" comparisons of visual and/or auditory media across vast collections.

In another embodiment, the media query system 100 may be used for cryptography/steganography in which embedding of messages (or watermarks) is spread across multiple images (e.g., a collage), which can only be reassembled by unique, possibly secret, query. Such a system may require, beyond steganographic decoding, a unique key for assembly, prior to which the decoding process cannot begin.)

In one embodiment, the system may be used as a means for automating a visual accompaniment to a song (i.e., an automatic music video maker). Further, such a means in which lyrics and or other text information, static or managed in a synchronized fashion with the audio of the song, is used to populate with video, images, text, animation, music notation and/or other visual output.

In one embodiment, the media query system 100 may be used as a user interface development tool for a scheduling application (e.g, Microsoft Project), in which the scheduling application is integrated with the system as an external (or internal) operator. Further, such a use in the system generates media presentations (video, animation, step-by-step storyboard style instructions, Gantt chart or other), visually explicating tasks, task relationships, and/or project overview(s).

In another embodiment, the media query system 100 may be used as a weblog (blog) browser, laying out and illustrating with appropriate media, topics of particular or current interest, which, due to the RDF-based meta-tagging intrinsic in most or all blog-authoring systems, can with reasonable reliability and consistency search blog text and tags, and tagged media, and can make presentation display judgments based on that text and metadata. Additionally, the use of the system described above integrated into a blog authoring engine in order to offer such a blog browser, and/or other approaches to search enhancement by the system as proposed in this document.

In one embodiment, the media query system 100 may be used with mobile devices, such as cell phones, personal digital assistants (PDAs), portable movie or music players, automotive or aircraft devices, or other mobile or embedded devices.

In one embodiment, a machine-readable medium may be provided having one or more instructions stored thereon, which instructions may be used to program a computer system or other electronic device to perform the operations described herein. A machine-readable medium may include any mechanism for storing or transmitting information in a form (e.g., software or processing application) readable by a machine (e.g., a computer). The machine-readable medium may include, but is not limited to, magnetic storage media (e.g., a floppy diskette), optical storage media (e.g., CD-ROM, CD-RW, DVD, etc.), magneto-optical storage media, read only memory (ROM), random access memory (RAM), erasable programmable memory (e.g., EPROM and EEPROM), flash memory, electrical, optical, acoustical, or other forms of propagated signal (e.g. carrier waves, infrared signals, digital signals, etc.), or other types of media suitable for storing electronic instructions.

The instructions and operations also may be practiced in distributed computing environments where the machine-readable media is stored on and/or executed by more than one computer system. In addition, the information transferred between computer systems may either be pulled or pushed across the communication media connecting the computer systems.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

We claim:

1. A method for generating a media presentation file containing composite media for display, the method comprising:

generating a hierarchy of templates by at least one parent template receiving at least one child template comprised of a candidate template element received based upon a request and a search query for candidate template elements;

interpreting one or more requests for at least one of media or templates in a framework template based on a user query input, wherein the framework template is comprised of the hierarchy of templates, wherein each template is comprised of corresponding slots for at least one of the candidate media elements and candidate template elements;

executing one or more search queries based on the one or more requests for media or templates to locate and download candidates comprised of at least one of candidate media elements or candidate template elements;

evaluating the candidates received from each of the one or more search queries to select winning media candidates comprised of selected candidate media elements and candidate template elements using design rules to change evaluation parameters associated with the candidates; and generating a media presentation file based on the defined presentation of composite media.

2. The method of claim 1, further comprising generating additional candidates for evaluation by appending one or more operations to one or more of the downloaded candidates.

3. The method of claim 2, further comprising changing an evaluation parameter associated with a candidate media element or a candidate template element based on the corresponding appended operation.

4. The method of claim 1, wherein the evaluation parameters comprise at least one of a statistical weight, previous use statistics, user ratings, candidate supplier rankings, or developer rankings.

5. The method of claim 1, further comprising determining an order of slot population and slot candidate evaluation within the framework template by using a prioritization algorithm.

6. The method of claim 1, wherein the presentation is a time based presentation comprising synchronizing the winning media candidates comprised of at least one or more of static media elements or dynamic media elements.

7. The method of claim 1, wherein prior to evaluating:

receiving and processing the user query input to determine a key term and one or more associated terms, wherein the key term is a query string and the one or more associated terms comprise taxonomic hierarchal relationship nodes related to the key term.

8. The method of claim 7, further comprising determining additional associated terms for each node of the taxonomic hierarchal relationship by processing each node's associated term.

9. The method of claim 7, wherein the key term and associated terms, and the additional associated terms are assigned to variables found within a request.

10. The method of claim 7, wherein the evaluating the presentation media to select winning media candidates further comprises using design rules to select one or more candidate template elements as winning media candidates based on a context of at least one of the key term or the one more associated terms.

11. The method of claim 10, wherein the selected one or more candidate template elements affect at least one of layout, functionality, duration, or size of the presentation of composite media.

12. The method of claim 1, wherein the executing one or more search queries based on the one or more requests for media or templates is further based on interpreting one or more request rules.

13. The method of claim 12, wherein the request rule modifies the one or more search queries based on design rules associated with a specific framework template.

14. The method of claim 1, further comprising communicating the media presentation file to a user on a client machine.

15. A media query server for automatically generating a presentation of composite media, comprising:

a processor; and a memory coupled to the processor, the memory to store instructions which when executed by the processor cause the media query server to generate a hierarchy of templates by at least one parent template receiving at least one child template comprised of a candidate template element received based upon a request and a search query for candidate template elements, interpret one or more requests for at least one of media or templates in a framework template based on a user query input, wherein the framework template is comprised of the hierarchy of templates, wherein each template is comprised of corresponding slots for at least one of the candidate media elements and candidate template elements, execute one or more search queries based on the one or more requests for media or templates to locate and download candidates comprised of at least one of candidate media elements or candidate template elements, evaluate candidates received from each of the one or more search queries to select winning media candidates comprised of selected candidate media elements and candidate template elements using an agenda manager, using design rules to change evaluation parameters associated with the candidates, and generate a presentation using the selected winning media candidates using a presentation generation module.

16. The media query server of claim 15, wherein prior to the media query server to interpret, the instructions when executed by the processor to cause the media query server to receive and process the user query input to determine a key term and one or more associated terms, wherein the key term is a query string and the one or more associated terms comprise taxonomic hierarchal relationship nodes related to the key term.

17. The media query server of claim 15, wherein the instructions when executed by the processor further cause the media query server to generate additional candidates for evaluation by appending one or more operations to one or more of the downloaded candidates.

\* \* \* \* \*